United States Patent [19]

Coates et al.

[11] Patent Number: 4,882,207
[45] Date of Patent: Nov. 21, 1989

[54] FERROELECTRIC LIQUID CRYSTAL CELLS

[75] Inventors: David Coates, Wimborne; Matthew F. Bone, Bishop's Stortford, both of Great Britain

[73] Assignee: STC Plc, London, England

[21] Appl. No.: 114,298

[22] Filed: Oct. 28, 1987

[30] Foreign Application Priority Data

Oct. 28, 1986 [GB] United Kingdom ............... 8625771
Dec. 15, 1986 [GB] United Kingdom ............... 8629904

[51] Int. Cl.⁴ .......................................... C09K 19/02
[52] U.S. Cl. ..................................... 428/1; 350/340; 350/341
[58] Field of Search ................ 428/1; 350/340, 341, 350/339 R

[56] References Cited

U.S. PATENT DOCUMENTS 4,678,283  7/1987  Kreuzer et al. ................... 428/1 X
4,730,904  3/1988  Pauluth et al. ................... 428/1 X

FOREIGN PATENT DOCUMENTS 2635630  2/1977  Fed. Rep. of Germany ...... 350/341

Primary Examiner—Alexander S. Thomas
Attorney, Agent, or Firm—Lee & Smith

[57] ABSTRACT

A ferroelectric liquid crystal cell is provided with one alignment layer (14) constituted by rubbed nylon which promotes planar alignment in a specific azimuthal direction and the other alignment layer (15) constituted by a polymer with flexible side chains which promotes planar alignment without any preferred azimuthal direction.

3 Claims, 1 Drawing Sheet

U.S. Patent  Nov. 21, 1989  4,882,207
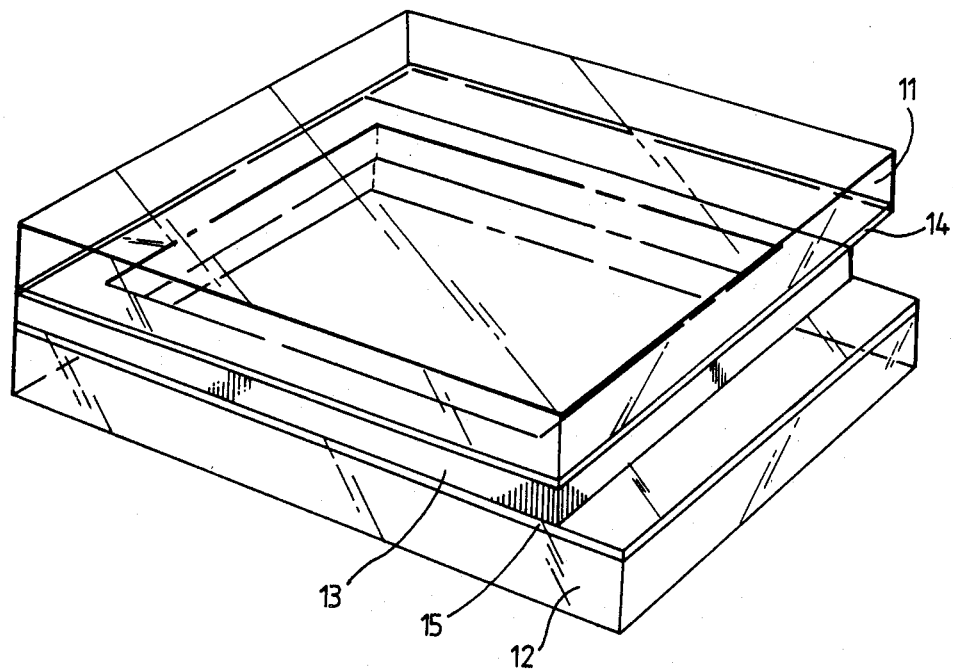

FERROELECTRIC LIQUID CRYSTAL CELLS

BACKGROUND OF THE INVENTION

This invention relates to ferroelectric liquid crystal cells, and in particular to a method of obtaining a preferred alignment of the liquid crystal molecules within such cells.

The conventional molecular alignment required for operation of a ferroelectric liquid crystal cell is one in which the smectic layers are formed in planes orthogonal to the major surfaces of the cell, such arrangements sometimes being termed 'bookshelf geometry'.

In suitable circumstances bookshelf geometry can be obtained for a material exhibiting the phase sequence:

$I-N^*-S_A-S_C^*$ by slow cooling of a cell that has rubbed major surfaces that promote planar alignment of the molecules in the nematic phase. (At least some of the individual molecules of the liquid crystal medium have to have a chiral centre for the medium to be ferroelectric in the tilted phase. The presence of a chiral component in a nematic phase normally induces a regular helical structure and the phase is termed cholesteric. A helical structure would interfere with the requisite alignment in the smectic phases and so is effectively eliminated by the use of suitable compensating chiral constituents of opposite handedness to produce a phase, commonly designated $N^*$, in which any residual cholesteric pitch is large compared with cell thickness. As the material cools into the $N^*$ phase the molecules assume planar alignment, with the molecular director lying in the rubbing direction, and this alignment is preserved as the material enters the $S_A$ phase. The smectic layers that are then produced lie in planes extending orthogonally with respect to the planes of the major surfaces of the cell, and on further cooling into the $S_C^*$ phase it is intended that the alignment of these smectic layers shall be substantially preserved while the directors of the molecules are rotated through a small angle to produce a tilted smectic phase.

In practice uniform alignment of the smectic A phase layers can be achieved quite easily when the major surfaces of the liquid crystal layer are confined by rubbed polymer film, but excellent alignment in the $S_A$ phase is found no guarantee of achieving satisfactory alignment in the $S_C^*$ phase. Particularly in the case of thin cells (having a liquid crystal layer thickness of about 2 microns), such as are typically employed for high speed switching, the density of alignment defects can be extremely high in the $S_C^*$ phase. Such defects adversely affect both the persistence of switching and the contrast ratio.

The wide occurrence of these defects is believed to be attributable in large part to the fact that the mechanism used to align the molecular director in the $N^*$ phase is liable to continue to exert an influence on molecular alignment when the liquid crystal layer is in the $S_C^*$ phase. In the $S_C^*$ phase, however, the rubbing direction is still normal to the planes of the smectic layers, and hence is not a direction appropriate for the director in a tilted smectic phase. Strain is therefore associated with this form of alignment. If both major surfaces of the cell are similarly aligned the strain concentration is seen to be increased as the liquid crystal layer thickness is reduced. It is possible for a situation to arise when it is energetically more favourable for the smectic layers to reorient than for the director to accommodate all the strain within the layers. It is believed that this may be a major factor contributing to the break-up of the layers in thin cells. Another contributing factor may be small misalignments of rubbing direction between the two major surfaces confining the liquid crystal layer.

Investigations have been made to see if the problem of the break-up of the layers is alleviated by constructing cells where only one of the confining surfaces is provided by a rubbed polymer layer instead of both surfaces. We have found that this can be the case with cells in which one confining surface is provided by a rubbed polymer covered transparent electroded glass substrate, while the other confining surface is provided by a similar substrate without the rubbed polymer layer. However, it has been found that the quality of the result is critically dependent upon the absence of blemishes in the surface of the second substrate. Preparation of satisfactory cells was found to be difficult, time consuming, and unpredictable. Much better results have been obtained by adopting the teachings of the present invention.

SUMMARY OF THE INVENTION

According to one aspect of the present invention there is provided a ferroeletric liquid crystal cell having a liquid crystal layer contained within an envelope, in which cell, for the promotion of parallel alignment of the molecules of the liquid crystal layer at least one of its two major surfaces, said at least one major surface is in contact with an associated polymer layer having a molecular structure with flexible side chains.

It is surmised that the flexible side chains of the polymer assist in the promotion of uniform planar alignment without providing any preferential azimuthal direction for that alignment.

If, instead of having rubbed polymer surfaces in contact with both major surfaces of the liquid crystal layer, only one major surface is in contact with a rubbed polymer surface, while the other major surface with a polymer with flexible side chains, the bookshelf alignment can still be produced by the method described above involving the slow cooling of the liquid crystal layer through $N^*$ and $S_A$ phases. But now the strain on entering an inclined smectic phase is less than before because the flexible side chain polymer layer can relatively freely accommodate the reorientation of the molecular director of nearby liquid crystal molecules upon their entering this phase. Some strain still remains as a result of the constraints imposed by the rubbed polymer contacting the other major surface of the liquid crystal layer. This source of strain can be removed by replacing not one but both of the rubbed polymer layers with the flexible side chain layers. Under these circumstances bookshelf alignment can not be induced in the same way as before. An alternative way of achieving bookshelf alignment would be by the known method involving the application of a small amount of mechanical shear to the liquid crystal layer by relative linear movement of its confining surfaces.

BRIEF DESCRIPTION OF THE DRAWING

There follows a description of a liquid crystal cell embodying the invention in a preferred form. The description refers to the accompanying drawing depicting a perspective schematic view of the cell.

DETAILED DESCRIPTION OF THE PREFERRED EMBODIMENT

A hermetically sealed envelope for a liquid crystal layer is formed by securing together two glass sheets 11 and 12 with a perimeter seal 13. The inward facing surfaces of the two sheets carry transparent electrode layers (not shown) of indium tin oxide, and these are in turn covered with polymer layers 14 and 15. The thickness of the liquid crystal layer contained within the resulting envelope is dtermined by the thickness of the perimeter seal 13, and the thickness of this is determined by a light scattering of plastics spheres of uniform diameter over the area enclosed by the perimeter seal. (Some of these spheres may also become incorporated into the material of the perimeter seal itself). Typically the thickness of such a cell may be about 2 um. Conveniently the cell is filled by applying a vacuum to the interior of the envelope via an aperture (not shown) through one of the glass sheets in one corner of the are enclosed by the perimeter seal so as to cause the liquid crystal medium to enter the cell via another aperture (not shown) located in the diagonally opposite corner. The filling operation is carried out with the filling material heated ito its isotropic phase so as to reduce its viscosity to a suitably low value. Subsequent to the filling operation the two apertures are sealed.

The polymer layers 14 and 15 are provided for liquid crystal molecular alignment purposes. Polymer layer 14 is a rubbed polymer layer of conventional type for molecular alignment, and may for instance be a nylon layer. The other polymer layer, layer 15, is a liquid crystal polymer constituted by a polysiloxane backbone with cyano-biphenyl benzoate side chain groups and having the general formula:

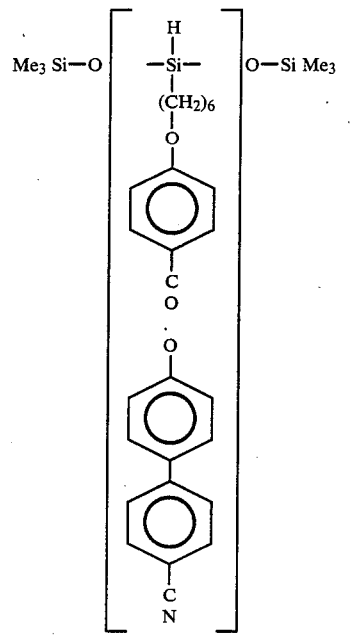

This liquid crystal polymer was applied from solution in the N-methyl pyrolidone to the transparent electroded glass substrate 12 by spinning. This substrate 12, and the other transparent electroded glass substrate 11 provided with a rubbed nylon coating, were sealed together with a polymer edge seal 13 to form a cell for filling with a proprietory ferroelectric liquid crystal mixture designated M622 developed by BDH with the following characteristics:

$S_C^*$-74° C.-$S_A$-105° C.-$N^*$-136° C.-I

In the foregoing it has been explained that the substitution of one rubbed polymer aligment layer of a ferroelectric liquid crystal layer by one of those unrubbed polymer layers with flexible side chains affords a reduction in the stain accommodated by the liquid crystal layer. A further reduction of such strain is clearly also achievable by replacement not only of the one rubbed surface, but of both rubbed surfaces, provided that the bookshelf alignment can still be induced and maintained by some other means.

We claim:

1. A ferroelectric liquid crystal cell having a liquid crystal layer contained within an envelope, in which cell, for the promotion of parallel alignment of the molecules of the liquid crystal layer at at least one of its two major surfaces, at least one of said major surfaces is in contact with an associated polymer layer having a molecular structure with flexible side chains of sufficient length and flexibility to provide no preferential azimuthal direction of alignment for the molecules of the liquid crystal layer in contact therewith.

2. A ferroelectric liquid crystal cell as claimed in claim 1 wherein the material of said polymer layer is a liquid crystal polymer.

3. A ferroelectric liquid crystal cell as claimed in claim 1 wherein one major surface of the liquid crystal layer is in contact with a polymer layer having said molecular structure with flexible side chains, while the other major surface is in contact with a polymer layer that has been rubbed in order to promote planar alignment of the molecules of the liquid crystal layer in the rubbing direction at least when those molecules are present in an untilted liquid crystal phase.

* * * * *